(12) United States Patent
Kethorn et al.

(10) Patent No.: US 9,732,853 B2
(45) Date of Patent: Aug. 15, 2017

(54) JOINT-SEALING STRIP

(75) Inventors: Bjoern Kethorn, Hamburg (DE);
Andreas Hohlfeld, Wennigsen (DE)

(73) Assignee: Hanno-Werk GmbH & Co. KG,
Laatzen (DE)

( * ) Notice: Subject to any disclaimer, the term of this patent is extended or adjusted under 35 U.S.C. 154(b) by 260 days.

(21) Appl. No.: 13/696,502

(22) PCT Filed: Dec. 21, 2011

(86) PCT No.: PCT/DE2011/002162
§ 371 (c)(1),
(2), (4) Date: Nov. 6, 2012

(87) PCT Pub. No.: WO2010/017947
PCT Pub. Date: Feb. 18, 2010

(65) Prior Publication Data
US 2013/0154201 A1    Jun. 20, 2013

(30) Foreign Application Priority Data
Dec. 23, 2010 (DE) .......... 10 2010 055 788

(51) Int. Cl.
*F16J 15/02* (2006.01)
*E06B 1/64* (2006.01)

(52) U.S. Cl.
CPC ........... *F16J 15/02* (2013.01); *E06B 1/64* (2013.01)

(58) Field of Classification Search
None
See application file for complete search history.

(56) References Cited

U.S. PATENT DOCUMENTS

| 4,767,655 | A | 8/1988 | Tschudin-Mahrer |
| 5,686,174 | A | 11/1997 | Irrgeher |
| 8,075,724 | B2 | 12/2011 | Deiss |
| 2009/0246498 | A1* | 10/2009 | Deiss ............... 428/220 |
| 2011/0120038 | A1 | 5/2011 | Würmann et al. |

FOREIGN PATENT DOCUMENTS

| CA | 2215502 | * 10/1996 | ........ E04B 1/76 |
| CA | 2 215 502 | 8/2005 | |
| DE | 1 934 395 U | 3/1966 | |
| DE | 35 44 277 | 4/1987 | |
| DE | 43 07 528 | 9/1994 | |
| DE | 93 12 987 U1 | 1/1995 | |

(Continued)

OTHER PUBLICATIONS

DE 19641415 English Machine Translation.*

(Continued)

*Primary Examiner* — Elaine M Vazquez
(74) *Attorney, Agent, or Firm* — Collard & Roe, P.C.

(57) ABSTRACT

A joint-sealing strip consisting of foam material has one or more moisture-variable membrane layers. The joint-sealing strip may have two longitudinal sides as well as a top side that borders on a joint flank in the installed state of the joint-sealing strip, and an underside that borders on an opposite joint flank in the installed state of the joint-sealing strip. The one or more memebrane layers may run in the longitudinal direction between the top side and underside, in each instance, as well as parallel to or almost parallel to the longitudinal sides.

22 Claims, 9 Drawing Sheets

(56) References Cited

FOREIGN PATENT DOCUMENTS

| | | |
|---|---|---|
| DE | 195 14 420 | 3/1997 |
| DE | 196 41 415 | 4/1998 |
| DE | 200 09 674 | 9/2000 |
| DE | 101 11 319 A1 | 9/2002 |
| DE | 101 23 260 A1 | 10/2002 |
| DE | 102 39 985 | 3/2004 |
| DE | 10 2006 043 050 A1 | 7/2007 |
| DE | 10 2008 049 210 A1 | 5/2009 |
| DE | 10 2009 013 107 A1 | 11/2009 |
| DE | 10 2008 03729 | 2/2010 |
| EP | 1 600 571 | 11/2005 |
| EP | 2 058 466 | 5/2009 |
| EP | 2 107 176 | 10/2009 |
| FR | 2 309 768 A1 | 11/1976 |
| WO | WO 96/33321 | 10/1996 |
| WO | 2004/022896 A1 | 3/2004 |
| WO | WO 2009127819 A1 * | 10/2009 ................ C09J 7/02 |
| WO | WO 2010/017947 | 2/2010 |

OTHER PUBLICATIONS

Lstiburek, Joseph, "Insulations, Sheathings and Vapor Retarders", Nov. 2004, Building Science Press.*

International Search Report of PCT/DE2011/002162, date of mailing Apr. 27, 2012.

H.M. Kuenzel and F.-J. Kasper: Von der Idee einer feuchteadaptiven Dampfbremse bis zur Markteinfuehrung [in English: From the idea of a moisture-adaptive vapor barrier up to the market introduction]. Bauphysik, Special print from: 20 (1998), pamphlet 6, pp. 257-260.

P. Steben: Vergleichsuntersuchungen zur Wasserdampfdurchlaessigkeit von Unterdeck- und Unterspannbahnen und Dampfsperren, Jun. 26, 2005, pp. 1-101.

* cited by examiner

Summer: reverse diffusion

JOINT-SEALING STRIP

CROSS REFERENCE TO RELATED APPLICATIONS

This application is the National Stage of PCT/DE2011/002162 filed on Dec. 21, 2011, which claims priority under 35 U.S.C. §119 of German Application No. 10 2010 055 788.9 filed on Dec. 23, 2010, the disclosure of which is incorporated by reference. The international application under PCT article 21(2) was not published in English.

BACKGROUND OF THE INVENTION

1. Field of the Invention

The invention relates to a joint-sealing strip.

Joint-sealing strips for providing a seal against air drafts and driving rain are known, for example, from DE 19641415 C2 or DE 20009674 U1, and are used in construction technology to seal window and door frames with regard to a masonry wall, to seal skylights, to seal layers of roofing tiles, etc.

2. Description of the Related Art

Proceeding from this state of the art, the invention is based on the task of developing such joint-sealing strips further, in such a manner that they fulfill the demands made on them with regard to driving rain tightness, vapor diffusion openness, heat insulation, and air tightness even better. Furthermore, the invention is based on the task of developing such sealing strips further, in such a manner that these can be quickly and cost-advantageously installed.

SUMMARY OF THE INVENTION

This task is accomplished with a joint-sealing strip composed of foam material, which has the characteristics mentioned in claim 1. Further developments and advantageous embodiments of the invention are evident from the following description and the dependent claims.

According to the invention, it is provided that a joint-sealing strip composed of foam material has one or preferably multiple moisture-variable or moisture-adaptive membrane layers.

Secure sealing of joints between joined components in housing construction, particularly between wall openings of an outer wall and window or door frames, is achieved with such a joint-sealing strip, whereby it is advantageous if no additional joint strips or filling materials are required. Because the membrane layers are moisture-variable or moisture-adaptive, the risk of confusion between the side of the joint-sealing strip that faces inward in the installed state and the side of the joint-sealing strip that faces outward is advantageously excluded. It is advantageous that an outer, middle, and inner seal of the joint between two joined components can be achieved in one work process. By means of the at least one moisture-variable or moisture-adaptive membrane layer, the desired tightness of the joint-sealing strip occurs by itself, as a function of the moisture. The joint-sealing strip is therefore quasi an intelligent joint-sealing strip, and there is no risk of confusion between the inside and the outside of the joint-sealing strip.

A further development of the invention provides that the composition of the membrane layer or membrane layers, that the arrangement of the membrane layer or membrane layers, and/or that the number of the membrane layers are selected in such a manner that the joint-sealing strip is less tight against water vapor in the region that borders on an atmosphere with high moisture than in the region that borders on an atmosphere with lower moisture.

A modified polyamide film can advantageously be used as a moisture-variable membrane layer. Such films are characterized in that their vapor permeability in the damp state is clearly higher than in the dry state. The films therefore have a variable $s_d$ value. An $s_d$ value is understood to mean the water vapor diffusion resistance of a material, also called the "diffusion-equivalent air layer thickness." The $s_d$ value, measured in meters with the unit "m", is calculated from the layer thickness of the material multiplied by the water vapor diffusion resistance number of the material, the so-called μ value, as defined in DIN EN ISO 12572:2001.

Suitable membrane layers are disclosed, for example, in DE 19514420 C1 or WO 9633321 A1, as materials having a water vapor diffusion resistance that is dependent on the ambient moisture.

The content of DE 19514420 C1 and WO 9633321 A1, respectively, is incorporated into the disclosure content of the present application by explicit reference, particularly with regard to these materials.

Further suitable membrane layers are disclosed, for example, in DE 102008037292 A1 or WO 2010017947 A2, as moisture-adaptive functional layers. The content of DE 102008037292 A1 and WO 2010017947 A2, respectively, is incorporated into the disclosure content of the present application by explicit reference, particularly with regard to these moisture-adaptive functional layers.

It can be advantageous if the joint-sealing strip has two longitudinal sides as well as a top side that borders on the one joint flank in the installed state of the joint-sealing strip, and an underside that borders on the opposite joint flank in the installed state of the joint-sealing strip, whereby the membrane layer or membrane layers run(s) in the longitudinal direction between top side and underside, in each instance, as well as preferably parallel to or almost parallel to the longitudinal sides. The width of the joint-sealing strip is therefore the distance between two longitudinal sides.

A further development of the invention provides that the composition of the membrane layer or membrane layers, that the arrangement of the membrane layer or membrane layers, and/or that the number of the membrane layers are selected in such a manner that the joint-sealing strip is tighter with regard to water vapor in the region that borders on an atmosphere with high moisture than in the region that borders on an atmosphere with lower moisture.

A joint-sealing strip according to the invention can be universally used for sealing a joint between two joined components, for example between a building structure, particularly a masonry wall, and a frame or the like, particularly a window or door frame. Such a joint-sealing strip, installed into a corresponding joint, has the advantage that it has a greater barrier effect on the side or the region that is exposed to greater diffusion stress, in each instance. This in turn has the advantage that during installation of a joint-sealing strip according to the invention, no attention has to be paid to which of the two longitudinal sides of the joint-sealing strip is disposed toward the interior space side or inside, and which is disposed toward the exterior space side or outside. The installation or laying of a joint-sealing strip according to the invention is therefore independent of the running direction of the strip.

The membrane layer or membrane layers can be disposed like barrier layers, axially in the joint-sealing strip, so that these, after installation of the joint-sealing strip, are disposed essentially transverse to the diffusion direction.

A joint-sealing strip according to the invention is moisture-variable, preferably in such a manner that the side that is exposed to the moister atmosphere is more diffusion-tight. In this way, moisture is always transported out of the joint, according to the invention, and diffusion of moisture into the joint is prevented.

A joint-sealing strip according to the invention functions in the typical winter situation required according to the RAL Gütegemeinschaft Fenster und Haustüren e.V. [RAL Quality Association for Windows and House Doors, registered association] (RAL guideline for planning and implementation of the installation of windows and house doors 2010), in which the seal toward the interior space or the inside is supposed to be tighter than the seal toward the exterior space or outside, because in the winter, interior spaces have a higher humidity than exterior spaces or the outside atmosphere. However, a joint-sealing strip according to the invention also functions in the typical summer situation, in which the diffusion reverses and the outside environment demonstrates higher humidity.

In this way, in total, drying out of the joint during the entire year is achieved. Therefore the RAL requirement concerning protection of the so-called connection joint between building structure and window frame, for example, against outside and inside stress, is ensured.

It can be practical if at least one membrane layer is configured in such a manner that it has a water vapor diffusion resistance ($s_d$ value) of less than 15 m diffusion-equivalent air layer thickness (measured in meters) at an average relative humidity of the atmosphere that surrounds it of up to 50%, and a water vapor diffusion resistance ($s_d$ value) of more than 30 m diffusion-equivalent air layer thickness (measured in meters) at an average relative humidity of the atmosphere that surrounds it of up to 70%.

For specific purposes of use, it can also be advantageous if a joint-sealing strip has multiple different sealing regions, in that the composition of the membrane layer or membrane layers, the arrangement of the membrane layer or membrane layers, and/or the number of membrane layers in a sealing region are selected in such a manner that the joint-sealing strip is tighter against water vapor in the region that borders on an atmosphere with high moisture than in the region that borders on an atmosphere with lower moisture, and are selected, in another sealing region, in such a manner that the joint-sealing strip is less tight against water vapor in the region that borders on an atmosphere with high moisture than in the region that borders on an atmosphere with lower moisture.

It can be advantageous if the foam material is predominantly an open-cell raw foam.

However, it can also be advantageous if the foam material is a predominantly closed-cell raw foam, such as that disclosed, for example, in EP 1 600 571 B1 as a foam having an air permeability of at most 50l/m²s. The content of EP 1 600 571 B1 is incorporated into the disclosure content of the present application, by explicit reference, particularly with regard to the foam material disclosed there.

It can be practical if the foam material is an impregnated, preferably a homogeneously impregnated raw foam. Such an impregnated foam material is particularly well suited for simple and universal joint sealing, whereby the impregnation particularly ensures delayed recovery of the compressible, preferably pre-compressed joint-sealing strip. It can be advantageous if the impregnate is made to be flame-retardant.

An advantageous embodiment of the invention provides that the foam material is a raw foam, preferably impregnated with acrylates in such a manner that the water vapor diffusion resistance of the foam material that is present in the installed state is less than the water vapor diffusion resistance of preferably every membrane layer.

A further development of the invention provides that at least one membrane layer is formed from an adhesive, preferably from an acrylate pressure-sensitive adhesive, or a mixture of an acrylate pressure-sensitive adhesive and a polyurethane adhesive.

It can be practical if at least one membrane layer is formed from at least one water-resistant modified acrylate, thereby making available high-performance, moisture-variable membrane layers that are more diffusion-tight at high humidity than at lower humidity, or vice versa, depending on their composition.

It can be advantageous if at least one membrane layer is formed from a modified polyamide film that is preferably glued to the foam material.

It can also be advantageous if at least one membrane layer is formed from a polyamide dispersion, preferably in the form of an adhesive.

A further development of the invention provides that the application weight of an adhesive for formation or co-formation of a membrane layer amounts to 60 to 200 g/m², preferably 100 to 150 g/m². For specific applications, it can be advantageous if the application weight amounts to 100 to 119 g/m². For certain applications, it can be advantageous if the application weight amounts to 120 to 130 g/m². For some applications, it can be advantageous if the application weight amounts to 131 to 150 g/m².

An advantageous embodiment of the invention provides that the adhesive for formation of the membrane layer has an adhesive strength according to AFERA 4001 of >20 N/25 mm.

It can be practical if at least one membrane layer has a greater water vapor diffusion resistance than the foam material.

A further development of the invention provides that at least two membrane layers have a composition that is different from one to the other.

An advantageous embodiment of the invention provides that the membrane layer or membrane layers is/are disposed within the foam material.

A further development provides that the membrane layer or membrane layers are permanently elastic, to fulfill improved diffusion values, so that the membrane layers remain permanently elastic even after aging in the compressed state and subsequent decompression or recovery, and lie tightly against the joint flanks at all times, in the installed state of the joint-sealing strip in a joint.

It can be advantageous if the joint-sealing strip has at least one membrane layer on one or on both longitudinal sides, in each instance, in addition to or in place of the membrane layers that lie on the inside.

A further development of the invention provides that when using multiple membrane layers, these can have the same and/or a different distance, between 5 mm and 100 mm, from one another, in each instance. For certain application cases, it can be advantageous if the distance amounts to between 5 mm and 13 mm. For specific application cases, it can be advantageous if the distance amounts to between 14 mm and 20 mm. For some application cases, it can be advantageous if the distance amounts to between 21 mm and 30 mm. For completely different application cases, it can be advantageous if the distance amounts to between 31 mm and 100 mm.

A further development of the invention provides that the distance between two membrane layers advantageously differs from the distance between two other membrane layers.

In specific cases of use, it can be practical if the membrane layer or the membrane layers is/are uniformly distributed or disposed over the width of the joint-sealing strip.

For certain cases of use, however, it can also be practical if the membrane layer or membrane layers is/are non-uniformly distributed or disposed over the width of the joint-sealing strip.

Thus, it can be advantageous, for some cases of use, if the membrane layer or membrane layers is/are disposed in the vicinity of one or both longitudinal sides of the joint-sealing strip. However, for some other cases of use, it can also be advantageous if the membrane layer or membrane layers is/are disposed further away from one or both longitudinal sides of the joint-sealing strip.

For some cases of use, it can be advantageous if the distance of the membrane layers varies from one longitudinal side to the other longitudinal side of the joint-sealing strip, preferably decreases and/or increases.

A further development of the invention provides that the foam material sections that run in the longitudinal direction and are divided by at least one membrane layer are configured differently, in such a manner that the joint-sealing strip is tighter against water vapor in the region that borders on an atmosphere with high moisture than in the region that borders on an atmosphere with lower moisture.

A further development of the invention provides that the foam material sections that run in the longitudinal direction and are divided by at least one membrane layer are configured differently, in such a manner that the joint-sealing strip is less tight against water vapor in the region that borders on an atmosphere with high moisture than in the region that borders on an atmosphere with lower moisture.

For some purposes of use, however, it can also be advantageous if multiple sealing regions are provided within a joint-sealing strip, in that in one sealing region, the foam material sections that run in the longitudinal direction and are divided by at least one membrane layer are configured differently, in such a manner that the joint-sealing strip is less tight against water vapor in the region that borders on an atmosphere with high moisture than in the region that borders on an atmosphere with lower moisture, and in another sealing region, the foam material sections that run in the longitudinal direction and are divided by at least one membrane layer are configured differently, in such a manner that the joint-sealing strip is tighter against water vapor in the region that borders on an atmosphere with high moisture than in the region that borders on an atmosphere with lower moisture.

It can be advantageous if at least two foam material sections have different weights per unit of volume.

It can be practical if the foam material is a PUR foam material, preferably a soft PUR foam material. This recovers particularly well within the joint after pre-compression, and ensures a permanent seal.

It can be advantageous if the foam material has multiple functional regions, preferably a first region that seals against driving rain, toward the outside, a second, heat-insulating as well as noise-proofing region, and a third region that is airtight toward the inside. In this connection, the membrane layers advantageously ensure a distinction of the aforementioned functional planes or the so-called functional regions as required by the RAL Gütegemeinschaft Fenster & Haustüren e.V. Heat insulation can be achieved that fulfills all the requirements of the energy saving regulations in window installation and the VOB [construction contact procedures] for carpentry work according to DIN 18/355.

It can be practical if the joint-sealing strip is compressible, preferably pre-compressed.

Advantageously, the joint-sealing strip can be pre-compressed in rolled form and can recover with a delay.

Preferably, the thickness of the joint-sealing strip in the non-compressed state amounts to between 10 mm and 100 mm, preferably between 18 mm to 60 mm.

A further development of the invention provides that the joint-sealing strip can be used for sealing joints between joined building elements in home construction, particularly between wall openings of an outer wall and window or door frames, preferably without the use of additional joint strips or filling materials.

BRIEF DESCRIPTION OF THE DRAWINGS

Further advantageous embodiments of the invention are evident from the drawings in combination with its description, whereby in the following, the invention will be explained using exemplary embodiments that are shown in the drawing. This shows.

DETAILED DESCRIPTION OF THE PREFERRED EMBODIMENTS

In the drawings, the characteristics essential for understanding the invention are shown and explained. If the same reference numbers are used in the figures, then they refer to the same parts.

Figure 1:
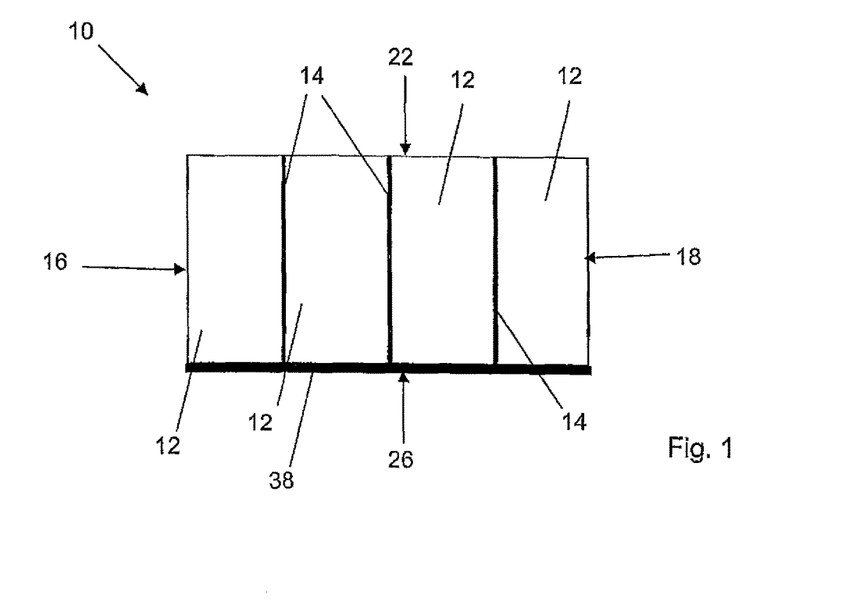
FIG. 1 a joint-sealing strip according to the invention in cross-section.
Figure 2:
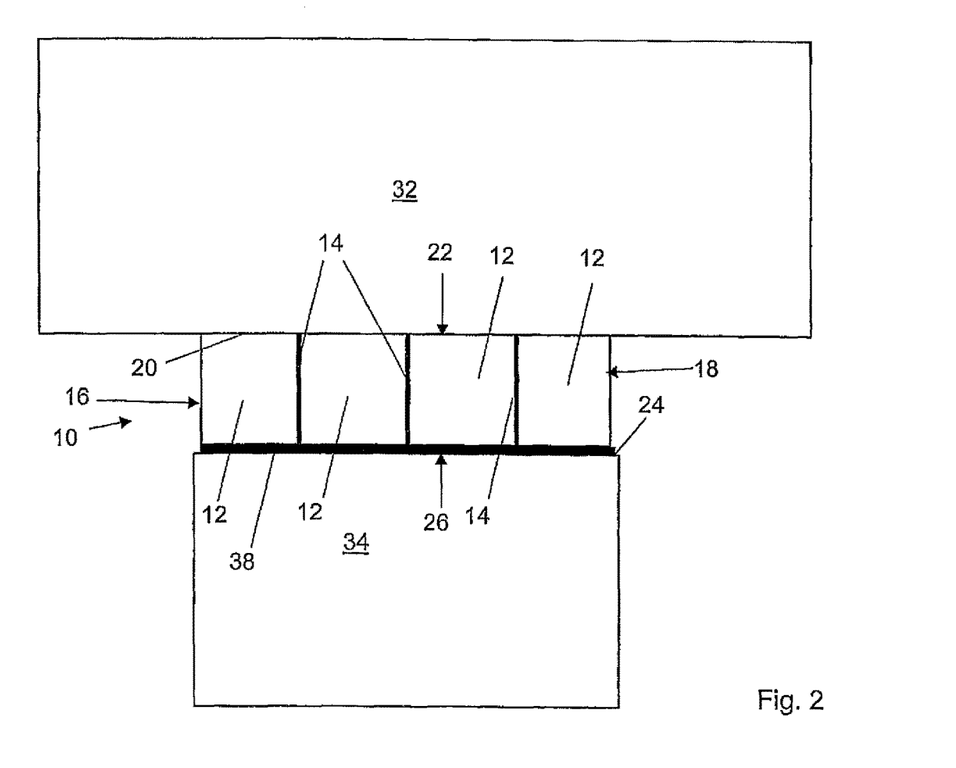
FIG. 2 a joint-sealing strip according to the invention in the installed state, within a joint, in cross-section, FIG. 3 a detail of a joint-sealing strip according to the invention in a perspective representation, with the main view of a longitudinal side, FIG. 4 a longitudinal side, a transverse side, and a top side of the joint-sealing strip according to the invention shown in FIG. 3, in an unfolded representation, FIG. 5 a joint-sealing strip according to the invention in the installed state, with a graphically represented water vapor diffusion gradient during a typical winter situation, FIG. 6 the same joint-sealing strip according to the invention according to FIG. 5 in the same installed state, with a graphically represented water vapor diffusion gradient during a typical summer situation, FIG. 7 a graphical representation of the diffusion resistance ($\mu$ value, $s_d$ value) of a joint-sealing strip according to the invention against the average relative humidity at 23° C., FIG. 8 a detail of a joint-sealing strip according to the invention with a pressure-sensitive adhesive layer on the underside, in a perspective representation, with the main view of a longitudinal side, FIG. 9 a side view of a joint-sealing strip according to the invention, kept on hand in rolled form and pre-compressed, FIG. 10 a side view of a joint-sealing strip according to the invention, kept on hand in rolled form and pre-compressed, with one section that has already been unrolled and is recovering, FIG. 11 a side view of a joint-sealing strip according to the invention, kept on hand in rolled form and pre-compressed, with a section that has already been unrolled and is recovering, which shows an arrangement of the membrane layers according to the invention, and FIG. 12 a setup for testing the water vapor permeability of joint-sealing strips according to the invention and not according to the invention.

FIG. 1 shows a joint-sealing strip 10 according to the invention in cross-section. The joint-sealing strip 10 consists of foam material 12 and has three moisture-variable membrane layers 14 The joint-sealing strip 10 comprises two longitudinal sides 16, 18, as well as a top side 22 and an underside 26, whereby the latter—as shown in FIG. 2—abut, in the installed state of the joint-sealing strip 10, against the one joint flank 20, for example an outer wall 32, on the one side 22, and against the opposite joint flank 24, for example a window frame 34, on the other side 26. The three membrane layers 14 run in the longitudinal direction 28, in each instance, between top side 22 and underside 26, as well as parallel to the longitudinal sides 16, 18. In this connection, all the membrane layers 14 lie within the foam material.

It is advantageous if the foam material 12 is a predominantly open-celled raw foam homogeneously impregnated with acrylates. The moisture-variable membrane layers 14 are advantageously formed from an acrylate adhesive that advantageously connects the individual foam material sections 12 at the same time.

As shown in FIG. 2, in the installed state of the joint-sealing strip 10, the membrane layers 14 are disposed transverse to a possible diffusion direction of the water vapor, whereby the composition of the membrane layers, the arrangement of the membrane layers 14, and the number of the membrane layers 14 are selected in such a manner that the joint-sealing strip 10 is tighter against water vapor in the region that borders on an atmosphere with high moisture than in the region that borders on an atmosphere with lower moisture.

Figure 3:
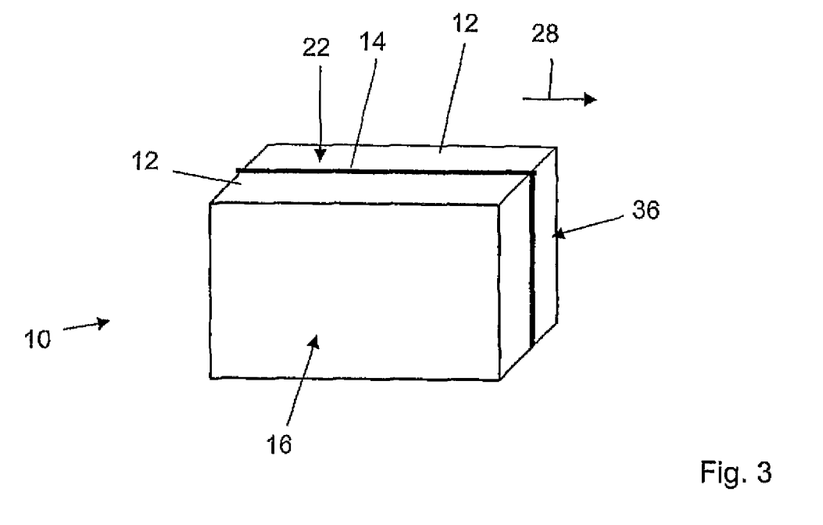
Figure 4:
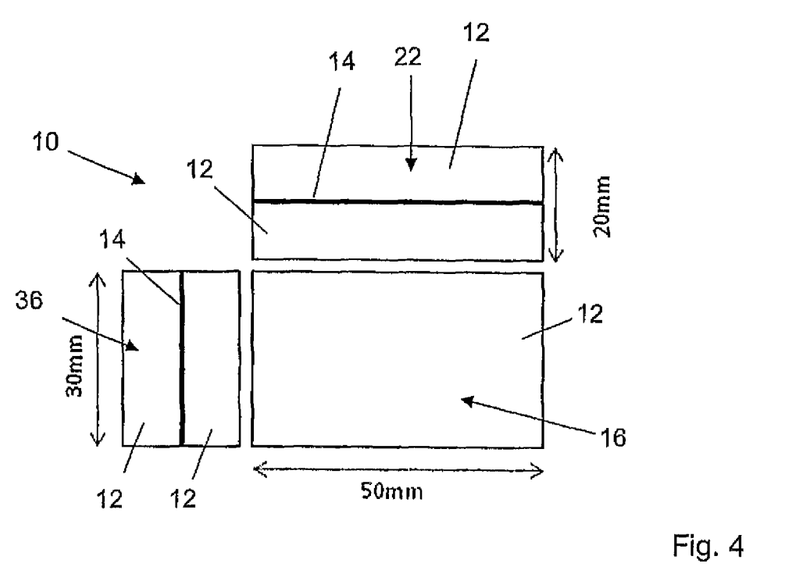

FIG. 3 shows, for a better illustration of a joint-sealing strip 10 according to the invention, a section of same, with a membrane layer 14 that lies on the inside, in a perspective representation, with the main view of a longitudinal side 16. Next to the longitudinal side 16 and the top side 22, a transverse side 36 can also be clearly seen. FIG. 4 shows the longitudinal side 16, the transverse side 36, and the top side 22 of the joint-sealing strip 10 according to the invention shown in FIG. 3, once again, in an unfolded representation. Of course these sides are present in double form.

Figure 5:
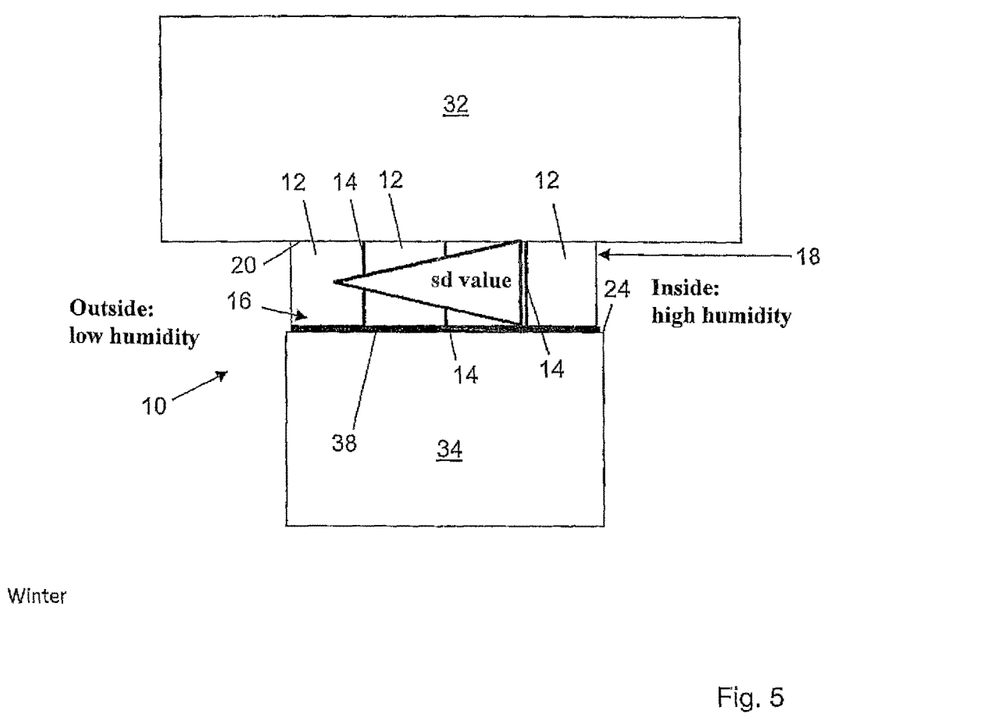

In FIG. 5, a joint-sealing strip 10 according to the invention is shown in the installed state, with a graphically represented water vapor diffusion gradient during a typical winter situation. In the winter, the humidity is low outside. Inside, in contrast, humidity is high.

Independent of which of the longitudinal sides 16, 18 is directed to the outside or the inside, a water vapor diffusion gradient occurs in the joint-sealing strip according to the invention. The region of the joint-sealing strip 10 that borders on an atmosphere with high moisture is tighter against water vapor than the region of the joint-sealing strip 10 that borders on an atmosphere with lower moisture. As a result, water vapor is prevented from entering into the joint from the inside, and, at the same time, the result is achieved that any water vapor that is present exits from the joint to the outside.

Figure 6:
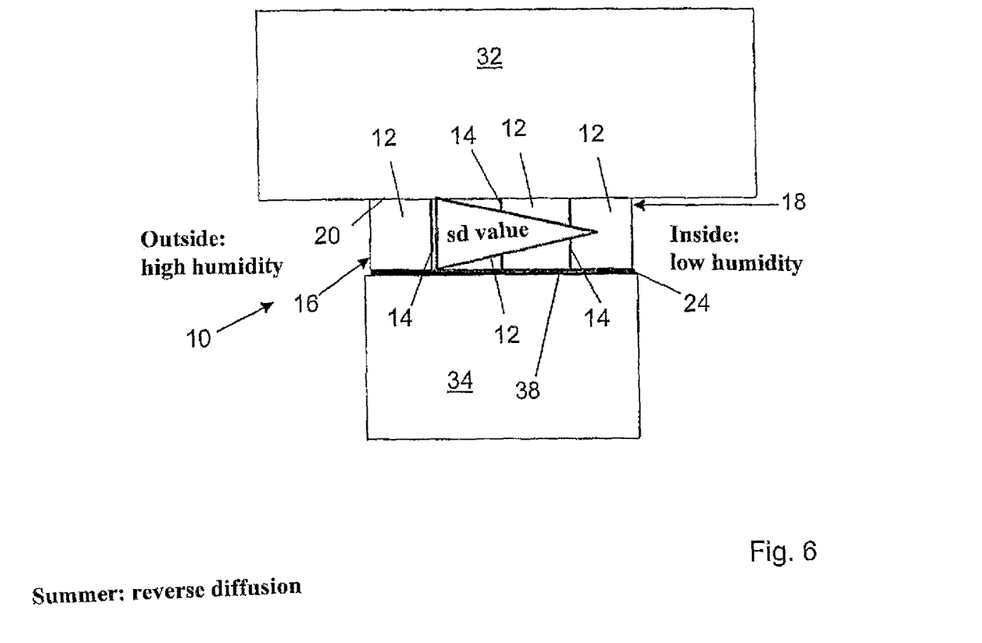

FIG. 6 shows the same joint-sealing strip according to the invention according to FIG. 5 in the same installed state, with a graphically represented water vapor diffusion gradient during a typical summer situation. In the summer, the humidity outside is high. Inside, in contrast, the humidity is lower.

Independent of which of the longitudinal sides 16, 18 is directed to the outside or the inside, a water vapor diffusion gradient occurs in the joint-sealing strip according to the invention, which is the opposite of the water vapor diffusion gradient according to FIG. 5. It is true that once again, the region of the joint-sealing strip 10 that borders on an atmosphere with high moisture is tighter against water vapor than the region of the joint-sealing strip 10 that borders on an atmosphere with lower moisture. However, in a typical summer situation, water vapor is prevented from entering into the joint from the outside, and, at the same time, the result is achieved that any water vapor that is present exits from the joint to the inside.

Figure 7:
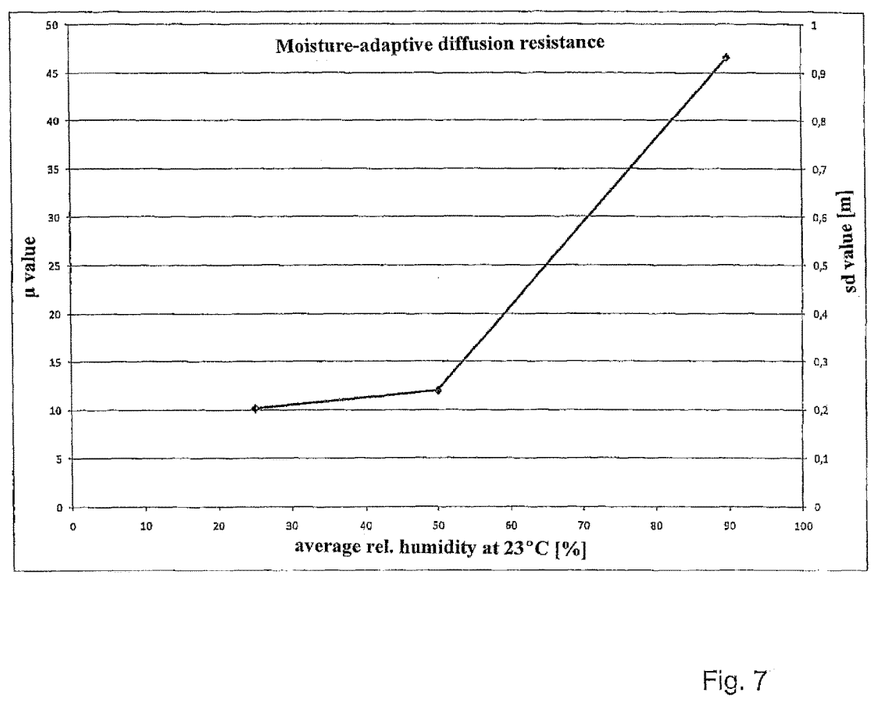

The representation shown in FIG. 7, of the diffusion resistance of a joint-sealing strip according to the invention against the average relative humidity at 23° C., illustrates the aforementioned effect. The higher the humidity, the greater the water vapor diffusion resistance becomes.

Figure 8:
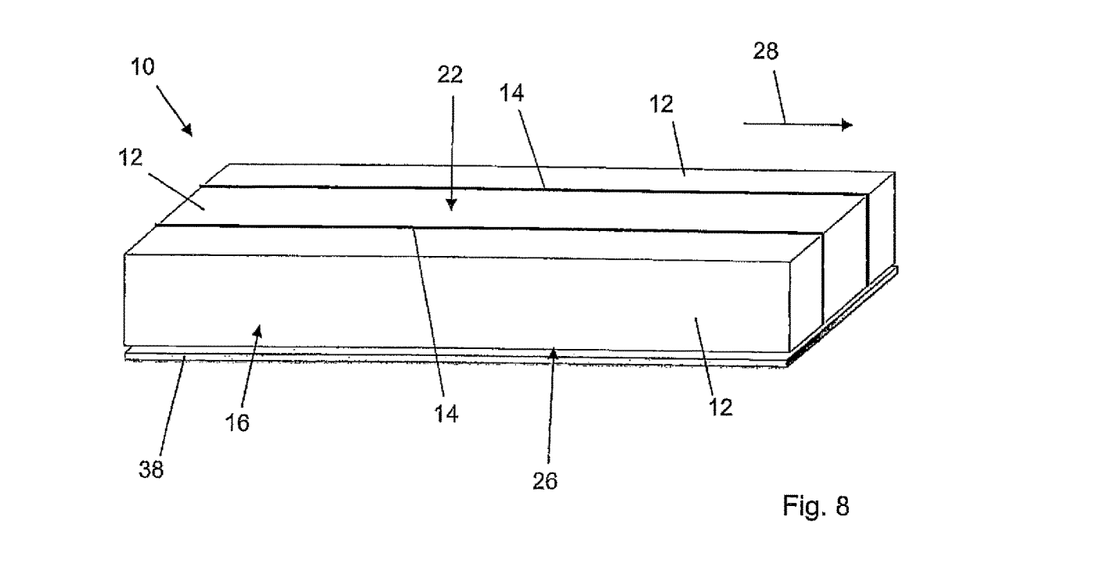

FIG. 8 shows a detail of a joint-sealing strip 10 according to the invention with a pressure-sensitive adhesive layer 38 on the underside 26, in a perspective representation, with the main view of a longitudinal side 16. The joint-sealing strip 10 according to the invention can be connected with a building element, particularly a door or window frame 34, in simplified manner, by means of this pressure-sensitive adhesive layer.

Figure 9:
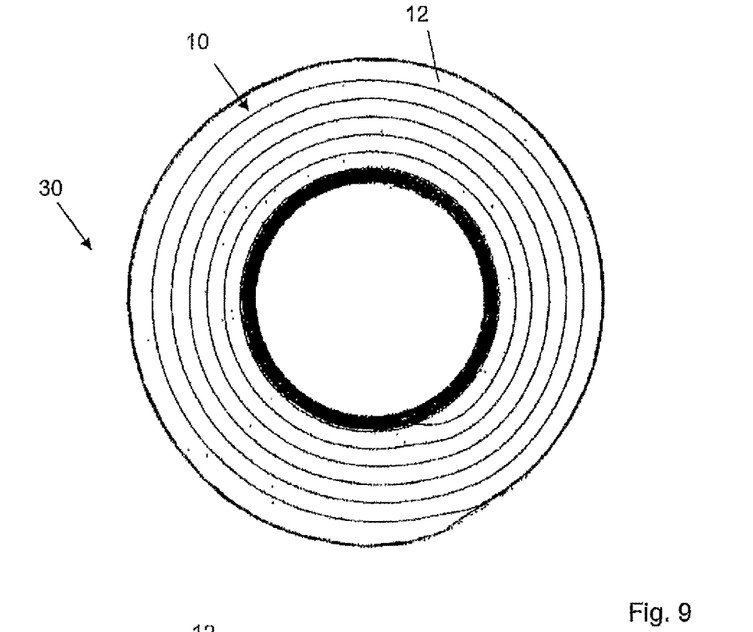
Figure 10:
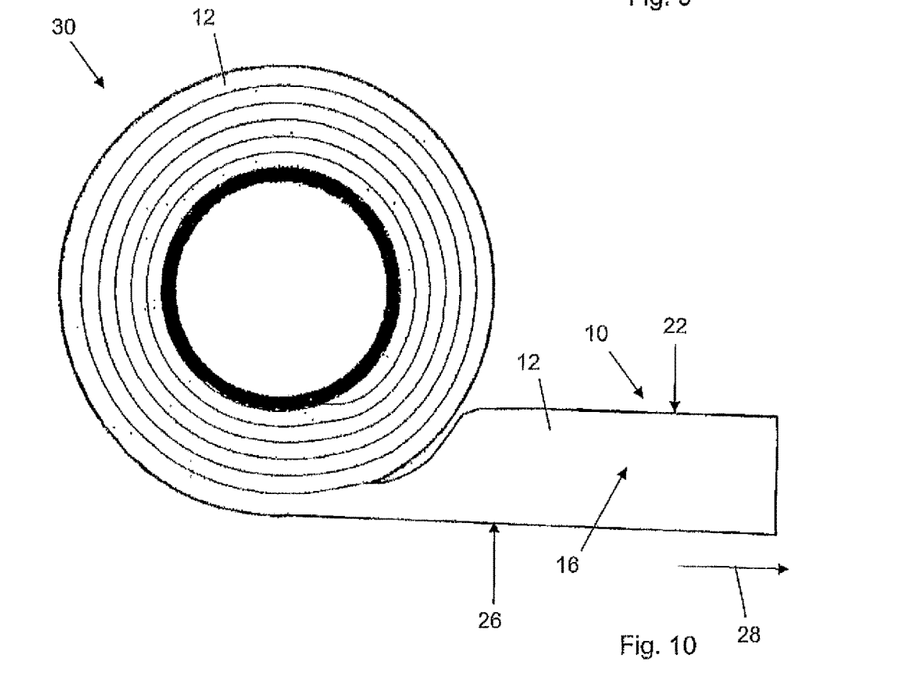
Figure 11:
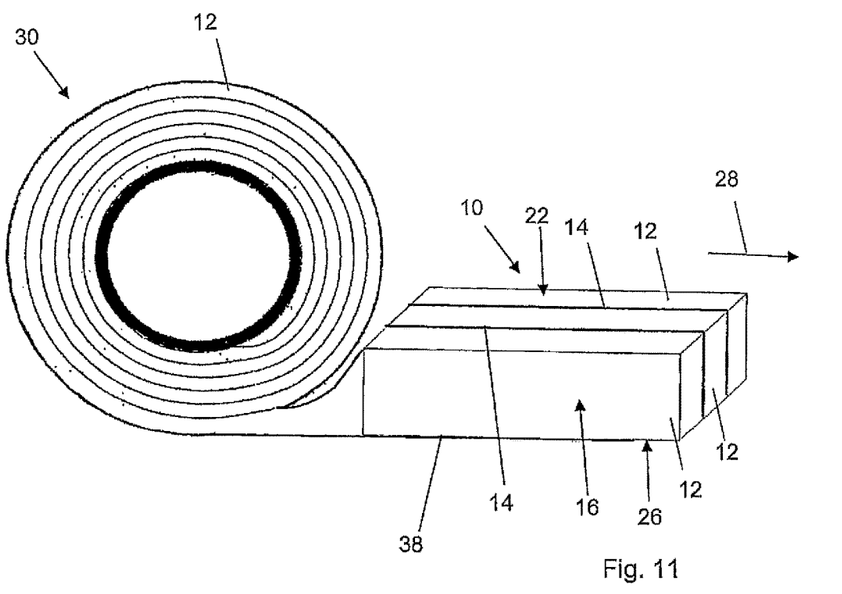

In FIG. 9, a side view of a joint-sealing strip 10 according to the invention, kept on hand in rolled form 30 and pre-compressed, is shown. FIG. 10 shows this rolled shape or roll 30 with a section that has already been unrolled and is recovering, whereby in FIG. 11, the arrangement of the membrane layers 14 according to the invention in the already unrolled, recovering state is illustrated.

Figure 12:
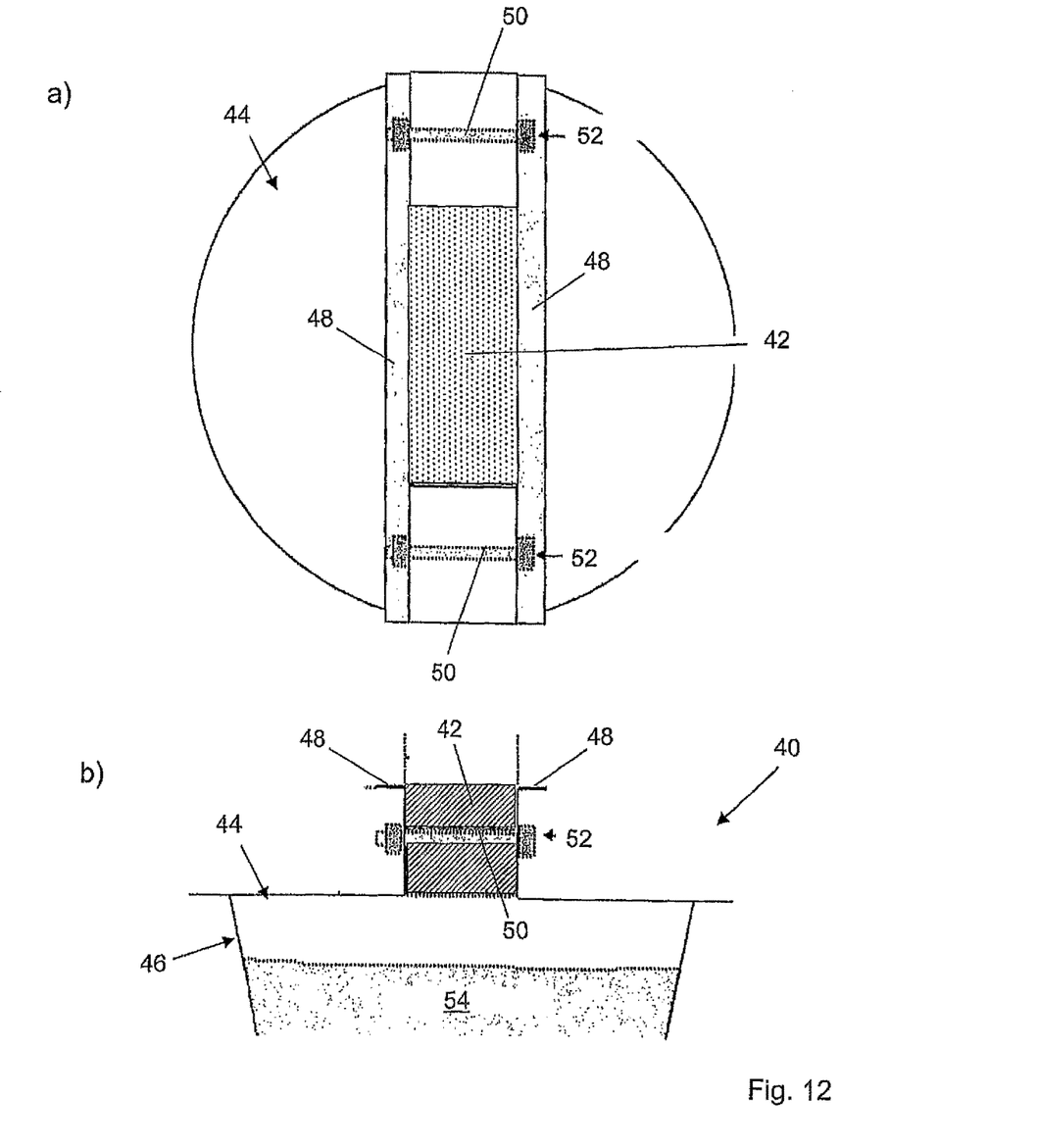

In the following, the essence of the invention will also be presented using comparison tests of the water vapor permeability, according to FIG. 12, using joint-sealing strips according to the invention and not according to the invention, at different relative moistures of the atmospheres that border on the joint-sealing strip 10.

The joint-sealing strip 10 according to the invention consists of a predominantly open-celled polyurethane raw foam that is impregnated with acrylates. The joint-sealing strip has two membrane layers that lie on the inside, composed of an elastic acrylate pressure-sensitive adhesive, in each instance, at a distance of 19 mm.

To determine the water vapor permeability, a section of the joint-sealing strip 10 according to the invention, having a membrane layer that cannot be seen here, is used. A comparison test is conducted with a corresponding joint-sealing strip not according to the invention, which does not have a membrane layer.

The determination of the water vapor permeability takes place according to DIN EN ISO 12572: 2001-09. In FIG. 12, a test vessel 40 with sample 42 for determining the water vapor permeability is shown, whereby a) shows a top view of the lid part 44 with sample 42, and b) shows a section through the lid part 44 and the lower part 46 in the form of a shell with drying agent.

Between the jaws 48 of the lid part 44, the samples 42 are fixed in place by means of corresponding spacers 50 and clamping screws 52. Lid part 44 and lower part 46 are tightly connected with one another.

A first test is conducted at 50% relative humidity and 23° C. The lower humidity is adjusted by means of silica gel that is situated in the lower part. Evaluation takes place according to DIN EN ISO 12572:2001 ($\mu$ value, $S_d$ value).

In this connection, the following measurement results are obtained:

Joint-sealing strip without membrane layer: 0/50% rel. humidity at 23° C.

| Diffusion stream | g/d | 0.275 |
| | mg/h | 11.47 |
| Diffusion-equivalent air layer thickness $s_d$ | m | 0.062 |
| Diffusion resistance number µ | | 3.1 |

Joint-sealing strip with a membrane layer: 0/50% rel. humidity at 23° C.

| Diffusion stream | g/d | 0.086 |
| | mg/h | 3.58 |
| Diffusion-equivalent air layer thickness $s_d$ | m | 0.203 |
| Diffusion resistance number µ | | 10.1 |

The water vapor diffusion resistance µ of the sample 42 with an inner membrane layer amounts to 10.1, on average, that of the sample 42 prepared in the same way without a membrane layer 3.1, on average. The water vapor diffusion resistance µ is clearly increased by the inner membrane layer.

A second test is carried out at 31%/65% relative humidity and 23° C. The lower humidity is adjusted by means of an absorbent 54, preferably a calcium chloride solution, which is situated in the lower part. The test vessel is placed into a climate chamber for adjusting the higher relative humidity. Evaluation takes place according to DIN EN ISO 12572 (µ value, $S_d$ value).

Joint-sealing strip with a membrane layer at: 31/65% rel. humidity at 23° C.

| Diffusion stream | g/d | 0.072 |
| | mg/h | 3.02 |
| Diffusion-equivalent air layer thickness $s_d$ | m | 0.239 |
| Diffusion resistance number µ | | 12.0 |

A third test is carried out at 85%/93% relative humidity and 23° C. The lower humidity is adjusted by means of the absorbent 54, preferably a saturated ammonium dihydrogen phosphate solution, which is situated in the lower part. The test vessel is placed into a climate chamber for adjusting the higher relative humidity.

Evaluation takes place according to DIN EN ISO 12572 (µ value, $S_d$ value).

Joint-sealing strip with a membrane layer at: 85/93% rel. humidity at 23° C.

| Diffusion stream | g/d | 0.018 |
| | mg/h | 0.77 |
| Diffusion-equivalent air layer thickness $s_d$ | m | 0.932 |
| Diffusion resistance number µ | | 46.6 |

The water vapor diffusion resistance of the samples with a membrane layer that lies on the inside amounts to 12.0, on average, at an average relative humidity of 48%. At an average humidity of 89%, the water vapor diffusion resistance µ increases to 46.6, on average.

From the determination of the $s_d$ value and µ value, respectively, of a "foam material with a membrane" minus the determination of the $s_d$ value and µ value, respectively, of a "foam material without a membrane," the following relationship is found for the determination of the $s_d$ value and µ value, respectively of a "membrane":

| Average relative humidity (23° C.) | $s_d$ value of membrane layer | µ value of membrane layer |
|---|---|---|
| 25% | 0.14 | 7.04 |
| 50% | 0.18 | 8.85 |
| 90% | 0.87 | 43.5 |

According to all this, it can be practical if a membrane layer is configured in such a manner that it has a water vapor diffusion resistance ($s_d$ value) of less than 15 m diffusion-equivalent air layer thickness at an average humidity of the atmosphere that surrounds it of up to 50%, and a water vapor diffusion resistance ($s_d$ value) of more than 30 m diffusion-equivalent air layer thickness at an average humidity of the atmosphere that surrounds it of more than 70%.

REFERENCE SYMBOL LIST

10 joint-sealing strip
12 foam material
14 membrane layer
16 longitudinal side
18 longitudinal side
20 joint flank
22 top side
24 joint flank
26 underside
28 longitudinal direction
30 rolled form
32 outer wall
34 window frame
36 transverse side
38 self-adhesive layer
40 test vessel
42 sample
44 lid part
46 lower part (shell)
48 jaw
50 spacer
52 clamping screw
54 absorbent

The invention claimed is:

1. A joint-sealing strip composed of foam material, wherein the joint-sealing strip has one or more moisture-variable membrane layers, wherein a water vapor diffusion resistance of the one or more moisture-variable membrane layers changes continuously depending on a surrounding moisture, such that a desired tightness of the joint-sealing strip adjusts itself depending on a surrounding moisture, wherein the composition of the one or more membrane layers, the arrangement of the one or more membrane layers, and/or the number of membrane layers are selected in such a manner that the joint-sealing strip is tighter against water vapor in a region that borders on an atmosphere with high moisture than in the region that borders on an atmosphere with lower moisture, and wherein the joint-sealing strip has two longitudinal sides as well as a too side that borders on a 1 pint flank in a installed state of the joint-sealing strip, and an underside that borders on an opposite joint flank in the installed state of the joint-sealing, wherein the one or more membrane layers run the longitudinal direction between the top side and underside, in each instance, as well, as parallel to or almost parallel to the longitudinal sides.

2. The joint-sealing strip according to claim 1, wherein the foam material is a predominantly open-celled raw foam.

3. The joint-sealing strip according to claim 1, wherein the foam material is an impregnated raw foam.

4. The joint-sealing strip according to claim 1, wherein the foam material is raw foam impregnated with acrylates in such a manner that the water vapor diffusion resistance of the impregnated foam material is less than the water vapor diffusion resistance of at least one membrane layer.

5. The joint-sealing strip according to claim 1, wherein at least one membrane layer is formed from an adhesive or a mixture of an acrylate pressure-sensitive adhesive and a polyurethane adhesive.

6. The joint-sealing strip according to claim 5, wherein the application weight of the adhesive for formation or co-formation of a membrane layer amounts to 60 to 200 g/m$^2$.

7. The joint-sealing strip according to claim 5, wherein the adhesive has an adhesive strength according to AFERA of greater than 20 N/25 mm.

8. The joint-sealing strip according to claim 1, wherein at least one membrane layer is formed from at least one water-resistant modified acylate.

9. The joint-sealing strip according to claimed 1, wherein at least one membrane layer is formed from a modified polyamide film that is glued to the foam material.

10. The joint-sealing strip according to claim 1, wherein at least one membrane layer is formed from a polyamide dispersion.

11. The joint-sealing strip according to claim 1, wherein at least one membrane layer has a greater water vapor diffusion resistance than the foam material.

12. The joint-sealing strip according to claim 1, wherein at least two membrane layers have a composition that is different from one to the other.

13. The joint-sealing strip according to claim 1, wherein the membrane layer or membrane layers is/are disposed within the foam material.

14. The joint-sealing strip according to claim 1, wherein the membrane layer or membrane layers are permanently elastic.

15. The joint-sealing strip according to claim 14, wherein the joint-sealing strip has at least one membrane layer on one or on both longitudinal sides, in each instance, in addition to or in place of the membrane layers that lie on the inside.

16. The joint-sealing strip according to claim 1, wherein when using multiple membrane layers, these have the same and/or a different distance of 5 mm to 100 mm, from one another, in each instance.

17. The joint-sealing strip according to claim 1, wherein the foam material is separated into sections that run in the longitudinal direction and are divided by at least one membrane layer and the sections are configured differently, in such a manner that the joint-sealing strip is tighter against water vapor in a region that borders on an atmosphere with high moisture than in the region that borders on an atmosphere with lower moisture.

18. The joint-sealing strip according to claim 1, wherein the foam material is a polyurethane (PUR) foam material.

19. The joint-sealing strip according to claim 1, wherein the joint-sealing strip is compressible.

20. The joint-sealing strip according to claim 1, wherein the joint-sealing strip is pre-compressed in rolled form and recovers with a delay.

21. The joint-sealing strip according to claim 1, wherein the thickness of the joint-sealing strip in the non-compressed state amounts to between 10 mm and 100 mm.

22. The joint-sealing strip according to claim 1, wherein the joint-sealing strip can be used for sealing joints between joined building elements in home construction.

\* \* \* \* \*

UNITED STATES PATENT AND TRADEMARK OFFICE
CERTIFICATE OF CORRECTION

PATENT NO. : 9,732,853 B2  
APPLICATION NO. : 13/696502  
DATED : August 15, 2017  
INVENTOR(S) : Kethorn et al.

Page 1 of 1

It is certified that error appears in the above-identified patent and that said Letters Patent is hereby corrected as shown below:

In the Claims

In particular, in Column 10, Line 60 (Line 17 of Claim 1) please change "too" to correctly read: --top--.

In Column 10, Line 60 (Line 17 of Claim 1) please change "1 pint" to correctly read: --joint--.

In Column 10, Line 64 (Line 21 of Claim 1) please change "run" to correctly read: --run(s)--.

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*